(12) United States Patent
Eromäki

(10) Patent No.: US 9,608,352 B2
(45) Date of Patent: Mar. 28, 2017

(54) INTERFACE FOR MULTIPLE CONNECTORS

(71) Applicant: Microsoft Technology Licensing, LLC, Redmond, WA (US)

(72) Inventor: Marko Eromäki, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 14/708,662

(22) Filed: May 11, 2015

(65) Prior Publication Data

US 2016/0336673 A1    Nov. 17, 2016

(51) Int. Cl.
*G06F 7/06* (2006.01)
*H01R 13/24* (2006.01)
*G06F 13/40* (2006.01)

(52) U.S. Cl.
CPC ........... *H01R 13/24* (2013.01); *G06F 13/409* (2013.01)

(58) Field of Classification Search
CPC .... G06F 3/044; G06F 3/0213; G06F 3/03547; G06F 2203/04104; G06F 3/041; G06F 1/1601; G06F 1/1616; G06F 1/1626; G06F 1/1632; G06K 9/0002
USPC ........................................................ 235/441
See application file for complete search history.

(56) References Cited

U.S. PATENT DOCUMENTS

| | | | |
|---|---|---|---|
| 6,581,830 B1 | 6/2003 | Jelinek et al. | |
| 6,612,492 B1 | 9/2003 | Yen | |
| 6,612,498 B1 | 9/2003 | Lipponen et al. | |
| 6,663,007 B1 | 12/2003 | Sun et al. | |
| 6,830,474 B2 | 12/2004 | Liu et al. | |
| 6,857,038 B2 | 2/2005 | Liu et al. | |
| 6,969,281 B2 | 11/2005 | Lai | |
| 6,976,624 B2 | 12/2005 | Hsiao | |
| 7,032,827 B2 | 4/2006 | Wang et al. | |
| 7,441,701 B2 | 10/2008 | Beck et al. | |
| 7,872,445 B2 * | 1/2011 | Hui | H01F 17/0006 320/108 |
| 8,103,309 B2 | 1/2012 | Lee | |
| 9,035,501 B2 * | 5/2015 | Azancot | H01F 38/14 307/104 |
| 2012/0217988 A1 | 8/2012 | Dickson et al. | |
| 2015/0031221 A1 | 1/2015 | Sloey et al. | |

FOREIGN PATENT DOCUMENTS

CN    101400176 A    4/2009

OTHER PUBLICATIONS

Burns, Matt, "Apple Declares Death to All the Ports", Published on: Mar. 9, 2015 Available at: http://techcrunch.com/2015/03/09/apple-decries-death-to-all-the-ports/#J1Fbfc:iSVu.

(Continued)

*Primary Examiner* — Seung Lee

(57) ABSTRACT

A device which allows connection of external objects is disclosed. The device comprises: an array of contact pads, each contact pad operable in an active state and an idle state; a space for one or more objects that can be inserted into the device to make contact with at least part of the contact pads when inserted; and a control element electrically connected to the contact pads. The contact pads in the active state are reconfigurable by the control element based on the contact made with at least part of the contact pads by one or more objects inserted into the device. A method and system are also presented.

20 Claims, 4 Drawing Sheets

(56) References Cited

OTHER PUBLICATIONS

"Dual-Supply 2:1 SIM Card Multiplexer/Translator with Slot Dedicated Dual LDO", Published on: Feb. 2011 Available at: http://www.ti.com/lit/ds/symlink/txs02324.pdf.
"International Search Report & Written Opinion Issued in PCT Application No. PCT/US2016/027651", Mailed Date: Jun. 28, 2016, 9 Pages.

* cited by examiner

INTERFACE FOR MULTIPLE CONNECTORS

BACKGROUND

Modern electronic devices often need to support multiple types of cards and connectors. Connection interfaces for cards are implemented as various standalone card connectors or modules in devices. Some connection interfaces support more than one card or connector type, either by combining multiple slots on one interface, or using one slot which supports a limited number of shapes. Some pins in such slots can be shared among two predetermined card types.

The embodiments described below are not limited to implementations which solve any or all of the disadvantages of known devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A device, method and system that provide connectivity for various connectable objects are presented. The device has an array of reconfigurable contact pads, e.g. in rows and columns, which help identify the type of the inserted object, for example by analyzing its geometrical properties; and connect the object with the device. The device may serve as a multipurpose connector. The method includes identification of connectable objects and activation of specific contact pads to match their contact areas. The system comprises both the device and the external connectable objects.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals can be used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
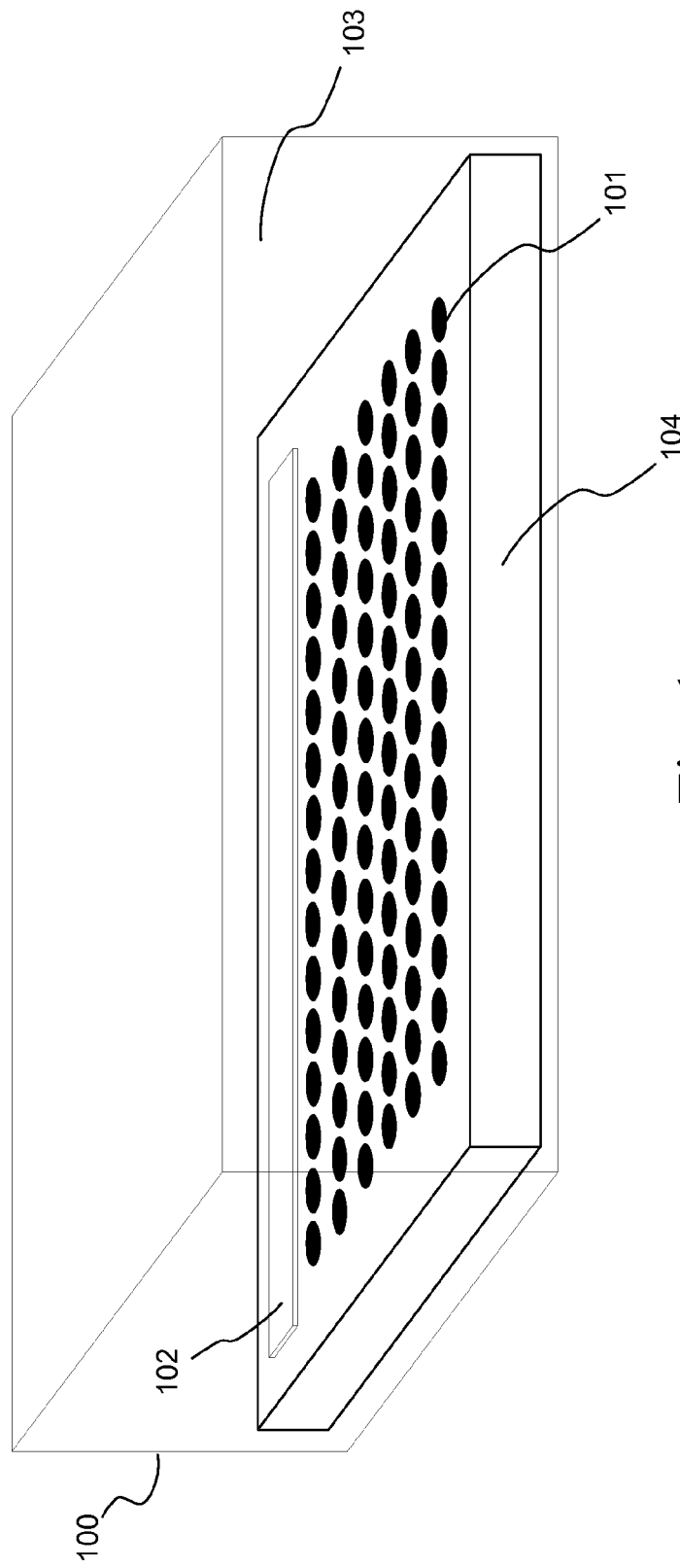
FIG. 1 depicts a device according to an embodiment.

FIG. 1 illustrates a device 100 according to an embodiment. The device comprises an array of contact pads 101 schematically shown by black circles in FIG. 1. The array of contact pads 101 may be in multiple rows and columns. The contact pads may be of different sizes and shapes, and the schematic figure does not represent proportions and sizes. Each contact pad 101 is operable in an active state and an idle state and can be made of conductive material. The device also comprises a control element 102 electrically connected to the contact pads 101. The control element 102 may be, for example, an integrated circuit (IC) or part of an integrated circuit of the device 100. The control element 102 may be an application specific integrated circuit, or may be a processor configured by firmware or software to perform a specific function. The control element 102 may be an The connection between the control element 102 and the contact pads 101 is not shown in FIG. 1 and can be done, for example, via traces, such as IC traces.

Figure 2A:
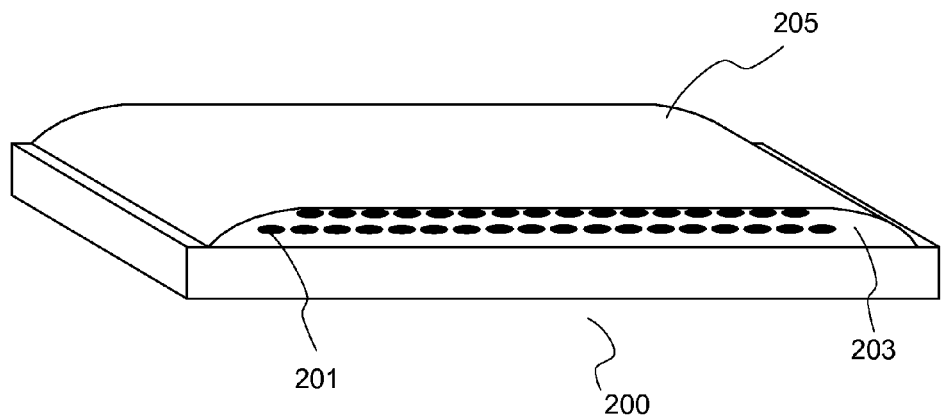
FIG. 2a shows a device with a casing on top according to an embodiment.
Figure 2B:
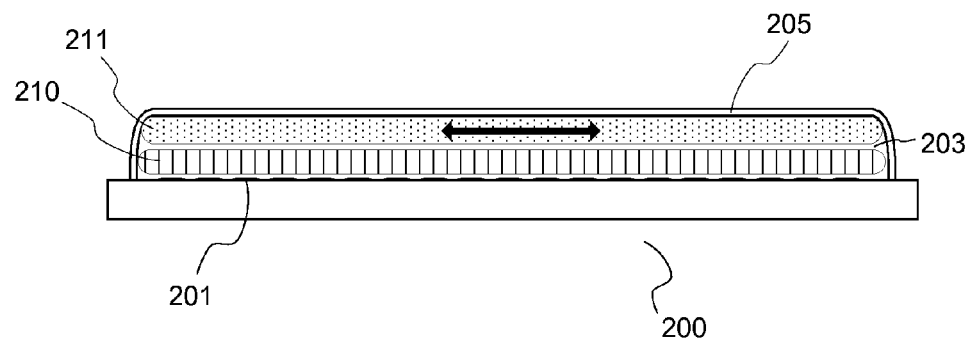
FIG. 2b is a side view of a device with a casing and two contact surfaces.
Figure 2C:
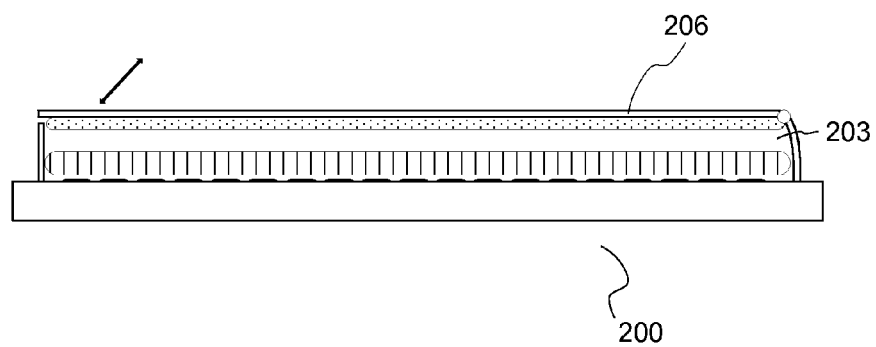
FIG. 2c is a side view of a device with a hinged lid and two contact surfaces.

The space 103 schematically illustrated by the outer borders on FIG. 1 is a space for one or more objects that can be inserted into the device 100 to make contact with at least part of the contact pads 101 when inserted. This space may be, but is not limited to, a card slot or a space for an external connector. In the example embodiment of FIG. 1 the space 103 is confined by the outer borders, and the objects can be inserted from the side of the device 100 facing the viewer. Alternatively or in addition, the objects can be inserted from the top or any other side suitable for the object type. The outer borders of the space may be formed by a casing, a lid or by the surrounding surfaces of the device 100. Some examples of this are shown in FIGS. 2a-2c. The external objects are not demonstrated on this figure.

The contact pads 101 in the active state are reconfigurable by the control element 102 based on the contact made with at least part of the contact pads 101 by one or more objects inserted into the device. In operation, one or more objects inserted into the device 100 make contact with at least part of the contact pads 101. This contact can be detected by the control element 102, and some of the contact pads 101 can be reconfigured by the control element 102 based on this detection. The reconfiguration can be done to connect the one or more inserted objects with the device 100. The detection can be based on the change in current or voltage received by the control element 102 from the contact pads 101. For example, a continuity check may be implemented in which control element 102 applies a known voltage or current to the contact pads 101, and also measures voltage or current at contact pads 101 to determine how the contact pads 101 are contacting an inserted object. Once the control element 102 determines which contact pads are electrically connected to pads on the object, the control element 102 may begin to communicate with the object via the contact pads 101 according, for example, to a standard protocol for communicating with a SIM card. Alternatively, control element 102 may be programmed to run a series of diagnostic protocols to determine what type of object is connected to the contact pads 101, and then determine which communication protocol to use based on the results of the diagnostic protocols. The space 103 for one or more objects that can be inserted into the device can be shaped to fit a flat object. The objects may be, for example, selected from: memory cards, subscriber identification module cards, chipped bank cards and flat electronic connectors.

According to an embodiment, the contact pads 101 may be positioned on a flat surface 104. The flat surface 104 may be, but is not limited to, a printed wiring board of the device 100. The flat surface 104 may form the bottom of the space 103 for insertable flat objects. The flat surface 104 and the contact pads 101 on top of it may be of any width, and the space 103 can house one or more than one external objects simultaneously.

As shown in FIG. 2a, the device may comprise a casing 205 enclosing at least the array of contact pads 201 and the space 203 for one or more objects that can be inserted into the device. The casing 205 may be a solid metal casing, a plastic casing or a casing of any other suitable material. The casing 205 may be formed as part of a larger casing of the device 200. The casing 205 may serve to secure the inserted objects in place and protect the contact pads 201 or other internal parts of the device 200 from damage.

In an embodiment shown on FIG. 2b, the device 200 comprises a contact surface 210 positioned between the array of contact pads 201 and the space 203 for one or more insertable objects. The contact surface 210 is electrically conductive in the vertical dimension, i.e. conducts electricity vertically from the contact pads 201 to the inserted object. So the inserted object can make contact with at least part of the contact pads 201 via the contact surface 210. In an embodiment, horizontal conductivity is substantially absent in the contact surface 210. The contact surface 210 may be elastic and selected from: an anisotropic sheet, and elastomer sheet, and an elastic sheet comprising nonconductive material and conductive wires. For example, conductive wires embedded into a nonconductive soft material may provide conductivity in the vertical direction. This can also prevent unwanted shortage between contacts of the inserted device.

FIG. 2b also shows an optional additional contact surface 211. The additional contact surface 211 can be positioned so that the space 203 is formed by the contact surface 210 and the additional contact surface 211. The additional contact surface 211 is electrically conductive in the horizontal dimensions, which is indicated by the black arrows in FIG. 2b. The additional contact surface 211 may be used for shorting the contact pads 201 when the casing 205 is made of non-conductive materials such as plastic. When the casing 205 is made of metal, the device 200 can be functional without the additional contact surface 211.

In operation, according to the above embodiments, the objects can be inserted into the space 203 between the two surfaces 210, 211, or the space above the contact surface 210 if there is no additional surface 211. The objects can be held in the space 203 by friction created due to compression between the contact surface 210 and the additional surface 211, or the inner wall of the casing 205 if there is no additional surface 211. The vertical conductivity of the contact surface 210 can provide contact between the inserted object and the contact pads 201. The pads 201 may have their contact closed when no object is inserted into the device 200 and the contact surface 210 is at a distance from the pads; and when an object is inserted, part of the contact surface 210 can press down the vertically conductive material on the contact pads 201, thereby opening contacts for the contact pads 201 directly below the inserted object. These contacts can be detected by the control element of the device 200, and some of the contact pads 201 can be reconfigured by the control element based on this detection. For example, if the inserted object is a memory card, the contact pads which are below the contacts of the memory card may be reconfigured to provide a connection with the memory card.

The optional additional contact surface 211 can provide a common ground for the electrical signals provided from the contact pads 201. The contact surfaces 210, 211 may be elastic and may create a secure slot for various types of cards and flat connectors, while providing sufficient precision for detection of different connector types based on the opened contacts for the contact pads 201.

FIG. 2c shows an embodiment of the device 200 comprising a hinged lid 206 in place of, for example, a solid casing 205. The small arrow shows possible movement of the hinged lid 206. The hinged lid 206 encloses the space 203 for one or more objects that can be inserted into the device when the hinged lid 206 is closed. While in the examples shown on FIGS. 2a-2b one or more external objects can be inserted from the side (facing the viewer on these figures), in the embodiment of FIG. 2c the one or more objects can be inserted from the top when the hinged lid 206 is open. The space 203 may be enclosed by walls on the sides. This structure can have an effect of providing different usage position and placement of the device 200 that can be suitable e.g. when a card is inserted for longer usage. This structure can also provide better protection of the space 203 from the environment.

The device 200 can further comprise a memory connected to the control element. The memory can store data including geometrical properties of one or more objects that can be inserted into the device 200. Geometrical properties may refer to, for example, shape, outline, and/or proportion of width and length. The memory may be part of a memory unit not shown on the figures. In the embodiment, the device 200 is configured to determine geometrical properties of one or more objects inserted into the device based on the contact made with at least part of the contact pads by the one or more objects inserted into the device. For example, in operation this can be done by monitoring the change in current or voltage received by the control element from the contact pads 201 and determining the outline of the inserted object based on which contact pads 201 have a changed current or voltage. The control element is configured to identify a type of the one or more objects inserted into the device 200 based on their geometrical properties. In operation, the identification could be done by comparing the determined geometrical properties of the inserted object with geometrical properties that are stored. The contact pads 201 in the active state are reconfigurable by the control element based on the identified type of the inserted object(s). For example, if the inserted object is a SIM card, and the memory stores geometrical properties of a SIM card, the control element can then identify that a SIM card is inserted based on the geometrical properties which are determined from the detected outline of the SIM card.

All or some of the above embodiments may have a technical effect of providing a universal connection device with one slot. Simultaneous use of different card or connector types can be made possible, as well as direct card-to-card communication. Since identification by geometrical properties is re-programmable, the embodiments can have a technical effect of independence of the card or connector type, and possible compatibility with future card or connector types.

A further technical effect can be freedom of alignment when external objects are inserted. When using the devices according to the above embodiments, a user may not need to secure the objects in a certain position. All or some of the above embodiments may also allow connection of plug-in devices without using a separate (standard) interface.

The devices according to any of the above embodiments may be formed as an external connection device. The devices may be used as a standalone equipment used for connections.

In an embodiment, a mobile apparatus may comprise the devices of any of the above embodiments. The devices may be used as part of a mobile apparatus.

Figure 3:
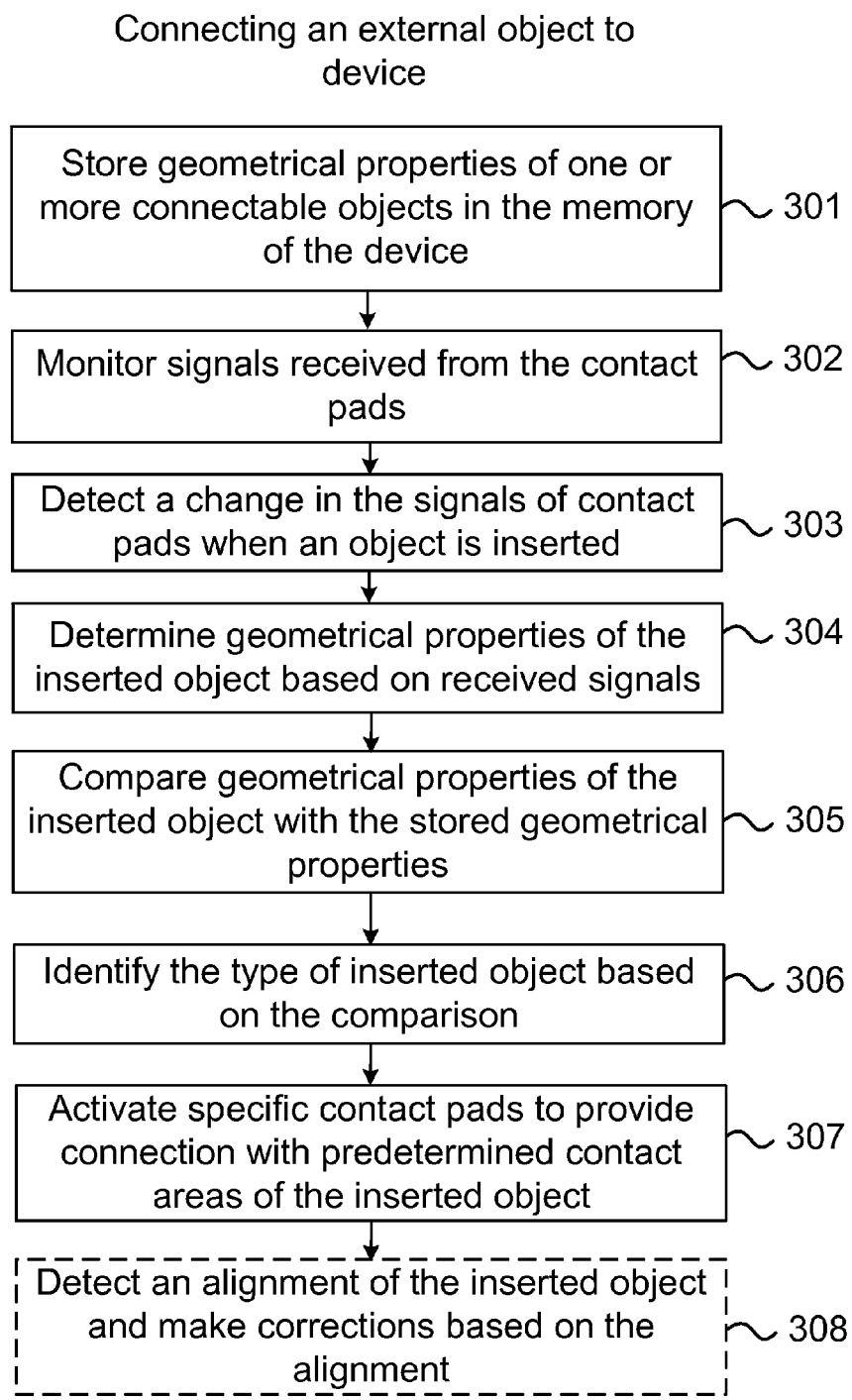
FIG. 3 illustrates a method according to an embodiment.

FIG. 3 shows a method for connecting a connectable object to a device according to an embodiment of the invention. The device comprises: an array of contact pads in multiple rows and columns, a space for one or more connectable objects that can be inserted into the device, and a memory. It may be the device shown on FIGS. 1 and 2a-2c in relation to any of the abovementioned embodiments. The device may also comprise a control element that may perform the method. The control element may also be separated from the device.

The method comprises storing geometrical properties of one or more connectable objects in the memory of the device at 301, monitoring 302 signals received from the contact pads, and detecting 303 a change in the signals of at least part of the contact pads when an object is inserted into the device. The signals received from the contact pads 302 may be a current or a voltage change sent to a control element of the device, wherein the contact pads are electrically connected to the control element.

The method further comprises determining 304 geometrical properties of the inserted object based on the received signals and comparing 305 the geometrical properties of the inserted object with the stored geometrical properties. This leads to identifying 305 the type of the inserted object based on the comparison. For example, if the inserted object is a SIM card, and the geometrical information of a SIM card has been stored in the memory, the SIM card can be identified by its shape compared to the stored shape. The inserted object makes contact with part of the contact pads which changes their signals monitored by the control element, a projection of the shape of the inserted object is created on the contact pads, and the geometrical properties of the inserted can thereby be determined.

The method also comprises activating 307 specific contact pads to provide a connection with predetermined contact areas of the inserted object. This can be done by activating those specific contact pads which geometrically coincide with contact areas on the inserted object. Optionally, the method can also comprise detecting 307 an alignment of the inserted object and determining geometrical properties of the inserted object based on the received signals and the detected alignment of the inserted object. If an external object does not need to be inserted securely into position, it may have a different alignment every time it is inserted. Detecting 307 an alignment of the inserted object and making corrections based on the alignment can include analyzing the projection of the shape and/or outline of the inserted object onto the contact pads, comparing the projection with the stored geometrical shape, and making an estimation of an angle at which the object was inserted into the device. Based on this estimation, activation 307 of specific contact pads to provide a connection with predetermined contact areas of the inserted object may be altered depending on the alignment.

The method can be performed for two or more objects inserted into the device simultaneously. In an embodiment, the method wherein two or more objects are inserted into the device can also comprise providing a connection between the inserted two or more objects via the activated contact pads. I.e. a connection between the inserted objects in addition to their connection to the device is possible.

The method illustrated in FIG. 3 may be implemented in hardware, software, or firmware. An application specific integrated circuit may perform that steps of the method in FIG. 3. Alternatively or additionally, a processor configurable by firmware or software may perform the method in FIG. 3.

Those skilled in the art will appreciate that the steps shown in Figure X may be altered in a variety of ways. For example, the order of certain steps may be rearranged; certain steps may be performed in parallel; certain shown steps may be omitted; or other steps may be included.

Figure 4:
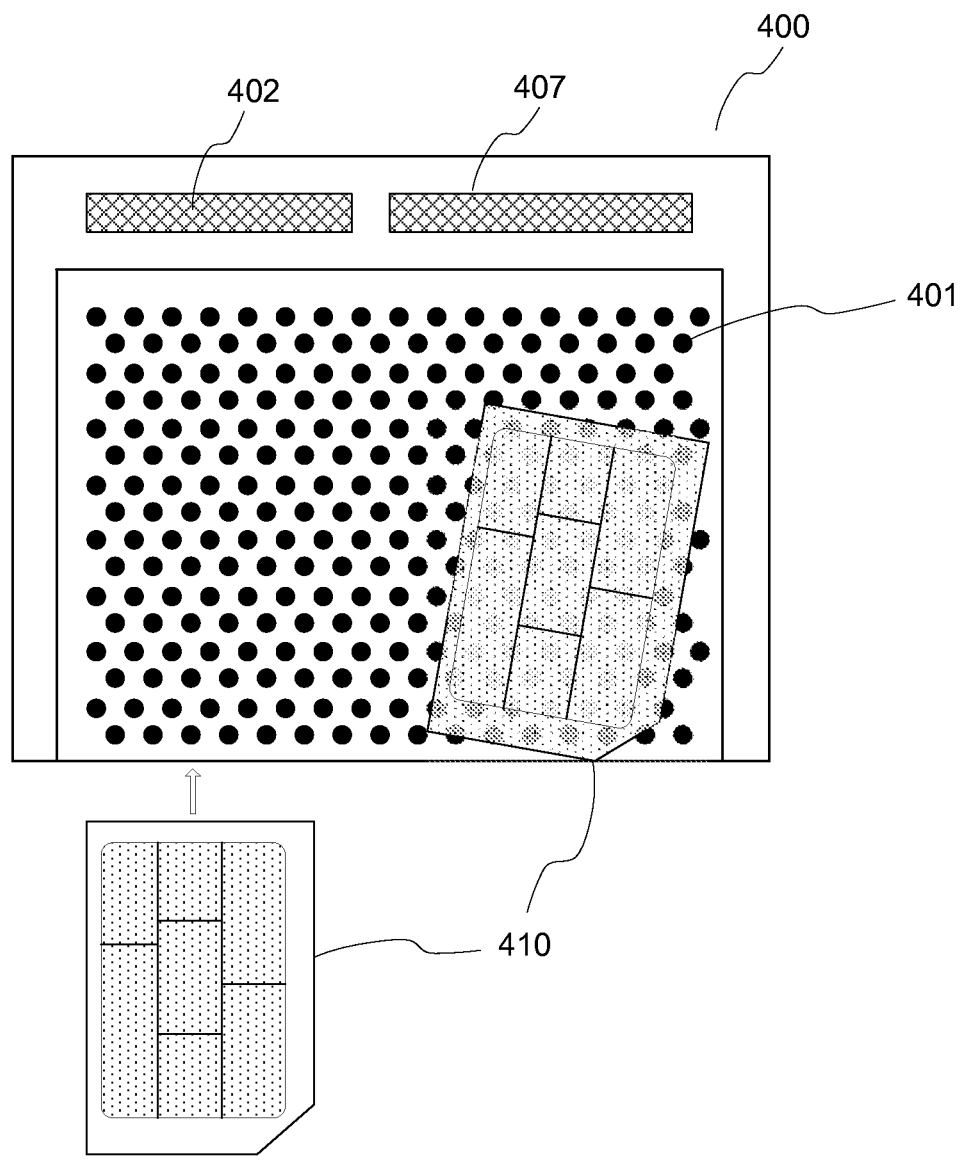
FIG. 4 shows a system with a device and external objects according to an embodiment.

FIG. 4 schematically illustrates a system according to an embodiment. The system comprises a device 400 which includes an array of contact pads 401, for example in multiple rows and columns; a control element 402 electrically connected to the contact pads 401; a space for one or more connectable objects; and a memory 407 connected to the control element configured to store data including geometrical properties of one or more connectable objects 410 that can be inserted into the device. The system also comprises one or more connectable objects 410 that can be inserted into the device 400 to make contact with at least part of the contact pads 401 of the device 400 when inserted.

In the system of FIG. 4, the control element 402 is configured to identify a type of one or more connectable objects 410 inserted into the device 400 based on: signals from at least part of the contact pads 401 with which the one or more connectable objects 410 make contact when inserted, and geometrical properties stored in the memory 407. The control element 402 is also configured to activate specific contact pads based on the identified object type, so that the activated contact pads match the contacts on the inserted connectable external object 410.

The connectable objects 410 that can be inserted into the device can be selected from: memory cards, subscriber identification module cards, credit cards and identification cards with embedded chips, and flat electronic connectors.

FIG. 4 shows an example wherein the connectable objects 410 are schematically illustrated as micro SIM cards. For exemplary purposes only, the inserted card 410 is also aligned at an angle to the sides of the device 400. However, the control element 402 of the device 400 can identify the type of the connectable objects 410 inserted into the device 400 by comparing their projection onto the contact pads 401 with the geometrical information stored in the memory 407, regardless of the alignment of the card. The control element 402 can also activate contact pads which match (end up positioned under) the contacts of the inserted object 410.

FIG. 4, as well as the other preceding figures, is not meant to represent any proportions, accurate shapes or sizes; on the contrary the illustration is purely schematic.

According to an aspect, a device is disclosed. The device comprises: an array of contact pads, each contact pad operable in an active state and an idle state; a space for one or more objects that can be inserted into the device to make contact with at least part of the contact pads when inserted; and a control element electrically connected to the contact pads. The contact pads in the active state are reconfigurable by the control element based on the contact made with at least part of the contact pads by one or more objects inserted into the device.

In an embodiment, the device comprises a flat surface, wherein the array of contact pads is positioned on the flat surface.

In one embodiment, alternatively or in addition to the above described embodiments, the device also comprises a contact surface positioned between the array of contact pads and the space for one or more objects that can be inserted into the device to make contact with at least part of the contact pads when inserted, wherein the contact surface is electrically conductive in the vertical dimension.

In an embodiment, the contact surface is elastic and selected from: an anisotropic sheet, and elastomer sheet, and an elastic sheet comprising nonconductive material and conductive wires.

In one embodiment, alternatively or in addition to the above described embodiments, the device comprises an additional contact surface positioned so that the space for one or more objects that can be inserted into the device is formed by the contact surface and the additional contact surface, wherein the additional contact surface is electrically conductive in the horizontal dimensions.

In one embodiment, alternatively or in addition to the above described embodiments, the device comprises a casing which encloses at least the array of contact pads and the space for one or more objects that can be inserted into the device.

In one embodiment, alternatively or in addition to the above described embodiments, the device comprises a hinged lid enclosing the space for one or more objects that can be inserted into the device when the hinged lid is closed.

In an embodiment, alternatively or in addition to the above described embodiments the device comprises a memory connected to the control element, wherein: the memory is configured to store data including geometrical properties of one or more objects that can be inserted into the device; the device is configured to determine geometrical properties of one or more objects inserted into the device based on the contact made with at least part of the contact pads by the one or more objects inserted into the device; the control element is configured to identify a type of the one or more objects inserted into the device based on their geometrical properties; and the contact pads in the active state are reconfigurable by the control element based on the identified type of the one or more objects inserted into the device.

In one embodiment, alternatively or in addition to the above described embodiments the geometrical properties of one or more objects that can be inserted into the device comprise at least one of: shape, outline, and proportion of width and length.

In an embodiment, alternatively or in addition to the above described embodiments, the space for one or more objects that can be inserted into the device is shaped to fit a flat object.

In one embodiment, alternatively or in addition to the above described embodiments, the device is formed as an external connection device.

In an embodiment, the device of any of the above embodiments is a mobile apparatus. Alternatively, in one embodiment, a mobile apparatus comprises the device of any of the above embodiments.

According to an aspect, a method for connecting a connectable object to a device is provided. The device comprises an array of contact pads, a space for one or more connectable objects that can be inserted into the device, and a memory. And the method comprises: storing in the memory of the device geometrical properties of one or more connectable objects that can be inserted into the device; monitoring signals received from the contact pads; detecting a change in the signals of at least part of the contact pads when an object is inserted into the device; determining geometrical properties of the inserted object based on the received signals; comparing the geometrical properties of the inserted object with the stored geometrical properties; identifying the type of the inserted object based on the comparison; and activating specific contact pads to provide a connection with predetermined contact areas of the inserted object.

In one embodiment, the signals received from at least part of the contact pads are received from those contact pads with which the inserted object makes contact.

In an embodiment, alternatively or in addition to the above described embodiment, the method comprises: receiving signals from at least part of the contact pads when two or more objects are inserted into the device; determining geometrical properties of the inserted two or more objects based on the received signals; comparing the geometrical properties of the inserted objects with the stored geometrical properties; identifying the types of the inserted objects based on the comparison; and activating specific contact pads to provide connections with predetermined contact areas of the inserted objects.

In one embodiment, alternatively or in addition to the above described embodiments, the method further comprises providing a connection between the inserted two or more objects via the activated contact pads.

In one embodiment, alternatively or in addition to the above described embodiments, the method comprises detecting an alignment of the inserted object, and determining geometrical properties of the inserted object based on the received signals and the detected alignment of the inserted object.

According to an aspect, a system is provided. The system comprises: a device which comprises an array of contact pads, a control element electrically connected to the contact pads, a space for one or more connectable objects, and a memory connected to the control element configured to store data including geometrical properties of one or more connectable objects that can be inserted into the device; and one or more connectable objects that can be inserted into the device to make contact with at least part of the contact pads of the device when inserted. The control element is configured to identify a type of one or more connectable objects inserted into the device based on: signals from at least part of the contact pads with which the one or more connectable objects make contact when inserted, and geometrical properties stored in the memory; and the control element is also configured to activate specific contact pads based on the identified object type, so that the activated contact pads match the contacts on the inserted connectable external object.

In one embodiment, one or more connectable objects that can be inserted into the device are selected from: memory cards, subscriber identification module cards, chip cards and flat electronic connectors.

In an embodiment, alternatively or in addition to the above described embodiments, the system comprises a mobile apparatus, wherein the device is embedded into the mobile apparatus.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device comprising:
   an array of contact pads, each contact pad operable in an active state and an idle state;
   a space for receiving one or more objects capable of being inserted into the device to make contact with at least part of the contact pads upon insertion; and
   a control element electrically connected to the contact pads;
   wherein the contact pads in the active state are reconfigurable by the control element based on the contact made with at least part of the contact pads by the one or more objects inserted into the device.

2. A device as claimed in claim 1, comprising a flat surface, wherein the array of contact pads is positioned on the flat surface.

3. A device as claimed in claim 1, comprising a contact surface positioned between the array of contact pads and the space for receiving the one or more objects capable of being inserted into the device to make contact with at least part of the contact pads upon insertion, wherein
   the contact surface is electrically conductive in the vertical dimension.

4. A device as claimed in claim 3, wherein the contact surface is elastic and selected from: an anisotropic sheet, and elastomer sheet, and an elastic sheet comprising nonconductive material and conductive wires.

5. A device as claimed in claim 3, comprising an additional contact surface positioned so that the space for receiving the one or more objects capable of being inserted into the device is formed by the contact surface and the additional contact surface,
   wherein the additional contact surface is electrically conductive in the horizontal dimensions.

6. A device as claimed in claim 1, comprising a casing enclosing at least the array of contact pads and the space for receiving the one or more objects capable of being inserted into the device.

7. A device as claimed in claim 1, comprising a hinged lid enclosing the space for receiving the one or more objects capable of being inserted into the device when the hinged lid is closed.

8. A device as claimed in claim 1, comprising a memory connected to the control element, wherein:
   the memory is configured to store data including geometrical properties of one or more objects capable of being inserted into the device;
   the device is configured to determine geometrical properties of one or more objects inserted into the device based on the contact made with at least part of the contact pads by the one or more objects inserted into the device;
   the control element is configured to identify a type of the one or more objects inserted into the device based on their geometrical properties; and
   the contact pads in the active state are reconfigurable by the control element based on the identified type of the one or more objects inserted into the device.

9. A device as claimed in claim 8, wherein the geometrical properties of the one or more objects capable of being inserted into the device comprise at least one of: shape, outline, and proportion of width and length.

10. A device as claimed in claim 1, wherein the space for receiving the one or more objects capable of being inserted into the device is shaped to fit a flat object.

11. A device as claimed in claim 1, formed as an external connection device.

12. A device as claimed in claim 1, wherein the device is a mobile apparatus.

13. A method for connecting a connectable object to a device, the method comprising:
   storing in a memory of the device geometrical properties of one or more connectable objects that can be inserted into the device;
   monitoring signals received from an array of contact pads associated with a space for receiving the one or more connectable objects into the device;
   detecting a change in the received signals of at least part of the array of contact pads responsive to an object being inserted into the device;
   determining geometrical properties of the inserted object based on the received signals;
   comparing the geometrical properties of the inserted object with the stored geometrical properties;
   identifying a type of the inserted object based on the comparison; and
   activating one or more specific contact pads of the array of contact pads to provide a connection with predetermined contact areas of the inserted object.

14. A method as claimed in claim 13, wherein the signals received from at least part of the contact pads are received from those contact pads with which the inserted object makes contact.

15. A method as claimed in claim 13, further comprising:
   receiving signals from at least part of the contact pads when two or more objects are inserted into the device;
   determining geometrical properties of the inserted two or more objects based on the received signals;
   comparing the geometrical properties of the inserted two or more objects with the stored geometrical properties;
   identifying individual types of the inserted two or more objects based on the comparison; and
   activating specific contact pads to provide connections with predetermined contact areas of the inserted two or more objects.

16. A method as claimed in claim 15, further comprising providing a connection between the inserted two or more objects via the activated contact pads.

17. A method as claimed in claim 13, further comprising detecting an alignment of the inserted object, and determining geometrical properties of the inserted object based on the received signals and the detected alignment of the inserted object.

18. A system, comprising:
a device which comprises:
- an array of contact pads;
- a control element electrically connected to the array of contact pads;
- a space for receiving one or more connectable objects into the device; and
- a memory, connected to the control element, that stores data including geometrical properties of the one or more connectable objects that make contact with at least part of the array of contact pads of the device upon insertion, wherein the control element identifies a type of the one or more connectable objects inserted into the device based on: signals from at least part of the array of contact pads with which the inserted one or more connectable objects make contact, and the geometrical properties stored in the memory, and activates one or more specific contact pads of the array of contact pads based on the identified type, so that the activated one or more specific contact pads match the contacts on the inserted one or more connectable objects.

19. A system as claimed in claim 18, wherein the one or more connectable objects are selected from: memory cards, subscriber identification module cards, chip cards and flat electronic connectors.

20. A system as claimed in claim 18, comprising a mobile apparatus, wherein the device is embedded into the mobile apparatus.

* * * * *